(12) United States Patent
Zhelev et al.

(10) Patent No.: US 12,301,158 B2
(45) Date of Patent: May 13, 2025

(54) DE-EXCITING SYSTEM FOR INDUCTIVE CIRCUITS

(71) Applicant: ABB Schweiz AG, Baden (CH)

(72) Inventors: Deyan Zhelev, Turgi (CH); Matthias Baechle, Eggingen (DE); Georg Meier, Turgi (CH)

(73) Assignee: ABB Schweiz AG, Baden (CH)

( * ) Notice: Subject to any disclaimer, the term of this patent is extended or adjusted under 35 U.S.C. 154(b) by 116 days.

(21) Appl. No.: 18/356,372

(22) Filed: Jul. 21, 2023

(65) Prior Publication Data
US 2023/0370003 A1 Nov. 16, 2023

Related U.S. Application Data

(63) Continuation of application No. PCT/EP2021/085885, filed on Dec. 15, 2021.

(30) Foreign Application Priority Data

Jan. 25, 2021 (EP) .................................... 21153278

(51) Int. Cl.
*H02P 7/00* (2016.01)
*H02P 9/08* (2006.01)
*H02P 9/12* (2006.01)

(52) U.S. Cl.
CPC ................ *H02P 9/123* (2013.01); *H02P 9/08* (2013.01)

(58) Field of Classification Search
CPC ........ H02P 27/06; H02P 2207/05; H02P 9/08; H02P 9/123
See application file for complete search history.

(56) References Cited

U.S. PATENT DOCUMENTS 6,442,051 B1 8/2002 Ryan et al.
2007/0279815 A1 12/2007 Li et al.
(Continued)

FOREIGN PATENT DOCUMENTS

CN 102318183 A 1/2012
CN 202997536 U 6/2013
(Continued)

OTHER PUBLICATIONS

Platero et al., "High-speed de-excitation system for brushless synchronous machines," *IET Electric Power Applications*, 6(3): 156-161 (Mar. 8, 2012).
(Continued)

*Primary Examiner* — Karen Masih
(74) *Attorney, Agent, or Firm* — Leydig, Voit & Mayer, Ltd.

(57) ABSTRACT

A de-exciting system for dissipating energy from an inductive circuit that comprises at least one coil adapted to be attached to said inductive circuit and comprising a series connection of a discharge resistor and a unidirectional discharge switching element; a unidirectional bypass switching element that is connected in parallel to the discharge resistor such that, when the de-exciting system is attached to the inductive circuit and both the discharge switching element and the bypass switching element are in a conducting state, a closed conducting path comprising the coil, the discharge switching element, and the bypass switching element is formed; and a control device configured to, in a first de-excitation phase, switch both the discharge switching element and the bypass switching element into a conducting state, and in a second de-excitation phase, switch the bypass switching element into a nonconducting state, while keeping the discharge switching element in the conducting state.

10 Claims, 3 Drawing Sheets

(56) References Cited

U.S. PATENT DOCUMENTS

| | | |
|---|---|---|
| 2011/0298430 A1 | 12/2011 | Platero Gaona et al. |
| 2015/0188470 A1 | 7/2015 | Platero Gaona et al. |

FOREIGN PATENT DOCUMENTS

| | | | |
|---|---|---|---|
| CN | 103201947 | A | 7/2013 |
| CN | 103929107 | A | 7/2014 |
| CN | 105119544 | A | 12/2015 |
| CN | 105471342 | A | 4/2016 |
| CN | 106992547 | A | 7/2017 |
| CN | 107196338 | A | 9/2017 |
| CN | 108023470 | A | 5/2018 |
| EP | 1780856 | A2 | 5/2007 |
| EP | 2063524 | A1 | 5/2009 |
| EP | 3595166 | A1 | 1/2020 |
| ES | 2585247 | A1 | 10/2016 |
| JP | H0662600 | A * | 3/1994 |
| JP | 2003-299398 | A | 10/2003 |
| JP | 2007-202286 | A | 8/2007 |
| WO | WO 2014/102444 | A1 | 7/2014 |
| WO | WO 2020/011410 | A1 | 1/2020 |

OTHER PUBLICATIONS

European Patent Office, Extended European Search Report in European Patent Application No. 21153278.3, 8 pp. (Jul. 5, 2021).
European Patent Office, International Search Report in International Patent Application No. PCT/EP2021/085885, 4 pp. (Mar. 22, 2022).
European Patent Office, Written Opinion in International Patent Application No. PCT/EP2021/085885, 6 pp. (Mar. 22, 2022).

* cited by examiner

DE-EXCITING SYSTEM FOR INDUCTIVE CIRCUITS

CROSS-REFERENCE TO RELATED APPLICATIONS

The instant application claims priority to International Patent Application No. PCT/EP2021/085885, filed Dec. 15, 2021, and to European Patent Application No. 21153278.3, filed Jan. 25, 2021, each of which is incorporated herein in its entirety by reference.

FIELD OF THE DISCLOSURE

The present disclosure generally relates to systems for the discharge of energy from inductive circuits, such as field windings of synchronous machines.

BACKGROUND OF THE INVENTION

A synchronous machine uses the interaction between two magneto-motive forces to bring a rotor into rotation at a frequency that is synchronous to the frequency of the multi-phase supply voltage. One of the two magneto-motive forces is provided by a magnetic flux in the rotor. A magnetic flux in the rotor may, in principle, be produced by permanent magnets. However, for the magnitudes of flux typically required in an industrial setting, permanent magnets are not suitable to vary the flux for controlling armature voltage and reactive current flow when connected to the power system. Therefore, to excite a magnetic flux in the rotor, a field coil mounted to the rotor is supplied with a DC current.

In case of a fault, such as a short circuit event, it may become necessary to quickly remove the magnetic flux from the rotor and discharge the current in the inductive circuit that comprises the field coil. EP 3 595 166 A1 discloses a method for performing a fast de-excitation of a brushless synchronous machine. A discharge resistor is connected in series with the power supply to the field coil and bridged by a switching element. In a normal operating state, the switching element is in a conducting state, and no discharge of the field current is taking place. In an abnormal operating state, the switching element is in a non-conducting state, and the field current is discharged through the discharge resistor.

BRIEF SUMMARY OF THE INVENTION

The present disclosure generally describes systems and methods that ease the wear that the de-excitation of inductive circuits, such as field coils of synchronous machines, puts on components, and also to ease the dimensioning requirements regarding these components.

A de-exciting system for dissipating energy from an inductive circuit that comprises at least one coil is described herein in an exemplary embodiment. This de-exciting system is adapted to be attached to the inductive circuit. It may, for example, be switched in a path between a power supply for the inductive circuit and the inductive circuit, so that it may pass power from the power supply to the inductive circuit in a normal state and discharge the inductive circuit in an abnormal state.

The de-exciting system comprises a series connection of a discharge resistor and a unidirectional discharge switching element. This series connection is arranged such that, if the de-exciting system is attached to the inductive circuit and the discharge switching element is in a conducting state, a closed conducting path comprising the coil and the discharge resistor is formed. That is, the series connection may bridge the inductive circuit if the discharge switching element is in a conducting state and the DC source is disconnected or its voltage is lower than the load voltage.

The resistor may comprise any sort of impedance that is suitable for dissipating energy flowing through it. For example, the resistor may be an Ohmic resistor. The resistor may be a linear resistor whose resistance is independent from the voltage and current applied to it. The resistor may alternatively be a non-linear resistor whose resistance depends on the voltage, the current, or other quantities.

The de-exciting system further comprises a unidirectional bypass switching element. This bypass switching element is connected in parallel to the discharge resistor such that, if the de-exciting system is attached to the inductive circuit and both the discharge switching element and the bypass switching element are in a conducting state, a closed conducting path comprising the coil, the discharge switching element, and the bypass switching element is formed.

The de-exciting system further comprises a control device. This control device orchestrates the switching of the switching elements. In a first de-excitation phase, the control device switches both the discharge switching element and the bypass switching element into a conducting state. When transitioning to a subsequent second de-excitation phase, the bypass switching element is switched into a non-conducting state. At the same time, the discharge switching element is kept in the conducting state.

Herein, the terms "conducting state" and "non-conducting state" are not to be construed in a limiting sense that a conducting state represents perfect conduction, and a non-conducting state represents perfect insulation. Rather, these terms mean that if the discharge switching element is in a conducting state, but the bypass switching element is in a non-conducting state, energy from the inductive circuit may be dissipated in the discharge resistor.

When both the discharge switching element and the bypass switching element are in a conducting state, the imposed current from the inductive circuit substantially passes around the discharge resistor, so that its stored energy is dissipated somewhere else, such as in the resistive part of the coil, the discharge switching element and in the bypass switching element; and when both the discharge switching element and the bypass switching element are in a non-conducting state, substantially no energy from the inductive circuit is being dissipated by the de-exciting system.

When energy from the inductive circuit with inductivity L is dissipated by a discharge resistor with impedance R, the time constant for this dissipation is given by L/R. That is, the larger the resistance, the more energy may be dissipated per unit time, and the faster a given amount of energy stored in the inductive circuit may be drained. Therefore, in theory, a large impedance R of the discharge resistor is advantageous. In practice, however, a large impedance R poses difficulties in combination with a disconnection of the inductive circuit from the power source that is inevitable if the inductive circuit is to remain non-energized, or the voltage across R becomes too high for the coil itself.

Such disconnection is usually performed with mechanical or electro-mechanical switches that bring two contacts together in order to permit a flow of current and separate these contacts again to stop the flow of current. When the contacts of a switch are separated under a load current, arcing between the contacts may occur. If the switch is not able to suppress or extinguish the arcing, in an extreme case, the arc may remain sustained while the contacts separate, up to the point where the contacts have separated by their maximum possible distance and the arc is still active. In this case, the switch is unable to break the current. Therefore, every switch that functions on the basis of moving contacts apart has a limitation as to the maximum voltage at which it can break a given load current.

While energy is being dissipated in the discharge resistor of impedance R due to a flow of a current I through the resistor, there is a voltage drop of I*R across the resistor. According to the Lenz rule, this voltage has the opposite polarity of the supply voltage. That is, an arc across a disconnecting switch, such as a circuit breaker, will be driven by the sum of the supply voltage and this voltage drop. Therefore, the higher the impedance R of the discharge resistor, the higher the requirements on the maximum voltage rating of the circuit breaker for breaking the current, which may be the maximum current that is being imposed on a field coil of a synchronous machine. The situation is exacerbated by the fact that rated ceiling field voltages of field coils have become bigger and bigger during recent times. If no circuit breaker that meets the voltage requirement can be obtained, or if the only available circuit breakers with a sufficient voltage rating fail to meet other requirement, it may become necessary to lower the impedance R of the discharge resistor and increase the discharge time.

In this situation, the advantageous effect of bypassing the discharge resistor in a first de-excitation phase, while using this discharge resistor in the second de-excitation phase, is two-fold.

First, in the first de-excitation phase, the field current is shorted through a much lower resistance. For example, if the discharge resistor and the bypass resistor are both configured as semiconductor switches (such as ICGT), the voltage drop may only amount to the combined threshold voltages of the freewheeling diodes of those two semiconductor switches, which may be on the order of 2 volts. By contrast, typical configurations of field currents I and impedances R might produce voltage drops on the order of 1,000 to 2,000 volts over the discharge resistor. Cutting this discharge resistor out of the loop in the first de-excitation phase therefore means that the voltage rating requirement of a circuit breaker through which the inductive circuit is powered is greatly reduced, and becomes independent from the value of the impedance R.

Second, during this first de-excitation phase, the low resistance through which the field current is diverted causes a fast-increasing current to flow via the bypass resistor and the discharge resistor. This means a fast-decreasing current is flowing via the circuit breaker that is in the process of opening. Therefore, less energy is being dissipated in an arc while the circuit breaker is opening. This prolongs the life of the circuit breaker. A small arcing voltage already starts the commutation process of source current into the bypass circuit, as the load would be without inductance, with a ratio of L/R approaching 0.

Both effects are highest if the conducting path through the bypass switching element and the discharge switching element is already established at the time at which the circuit breaker begins to open, and arcing may occur.

Therefore, in a particularly advantageous embodiment, the control device of the de-exciting system is coupled or integrated with a control device of a circuit breaker in a powering path to the inductive circuit and configured to: in response to a request for de-excitation of the inductive circuit, begin the first de-excitation phase before the circuit breaker begins to open.

The process of arcing is only necessary in a short timeframe while the circuit breaker is opening. Once the contacts of the circuit breaker have moved apart far enough, and also any air in the space between the contacts that had been ionized by previous arcing has regained its insulating properties, the circuit breaker can withstand a much higher voltage than in the state where it is just opening. An arc would have to jump the full gap between the contacts, so the electric field strength between the contacts would have to be larger than the breakdown field strength. By contrast, when the circuit breaker just starts to open, an arc is easily created across the near-zero distance between the contacts.

Therefore, in a particularly advantageous embodiment, the control device of the de-exciting system is further configured to: begin the second de-excitation phase after the circuit breaker has reached its full insulation capability. The moment at which the full insulation capability is reached may be measured or estimated by any suitable method. For example, it may be determined in lab experiments how long it usually takes to reach full insulation capability, and then a timer may be set such that upon expiry of this timer, the circuit breaker can be guaranteed to be fully insulating. In this manner, as soon as the high voltage drop across the high impedance R of the discharge resistor no longer poses a problem, this discharge resistor may be used to dissipate the energy from the inductive circuit as fast as possible.

BRIEF DESCRIPTION OF THE SEVERAL VIEWS OF THE DRAWING(S)

DETAILED DESCRIPTION OF THE INVENTION

Figure 1:
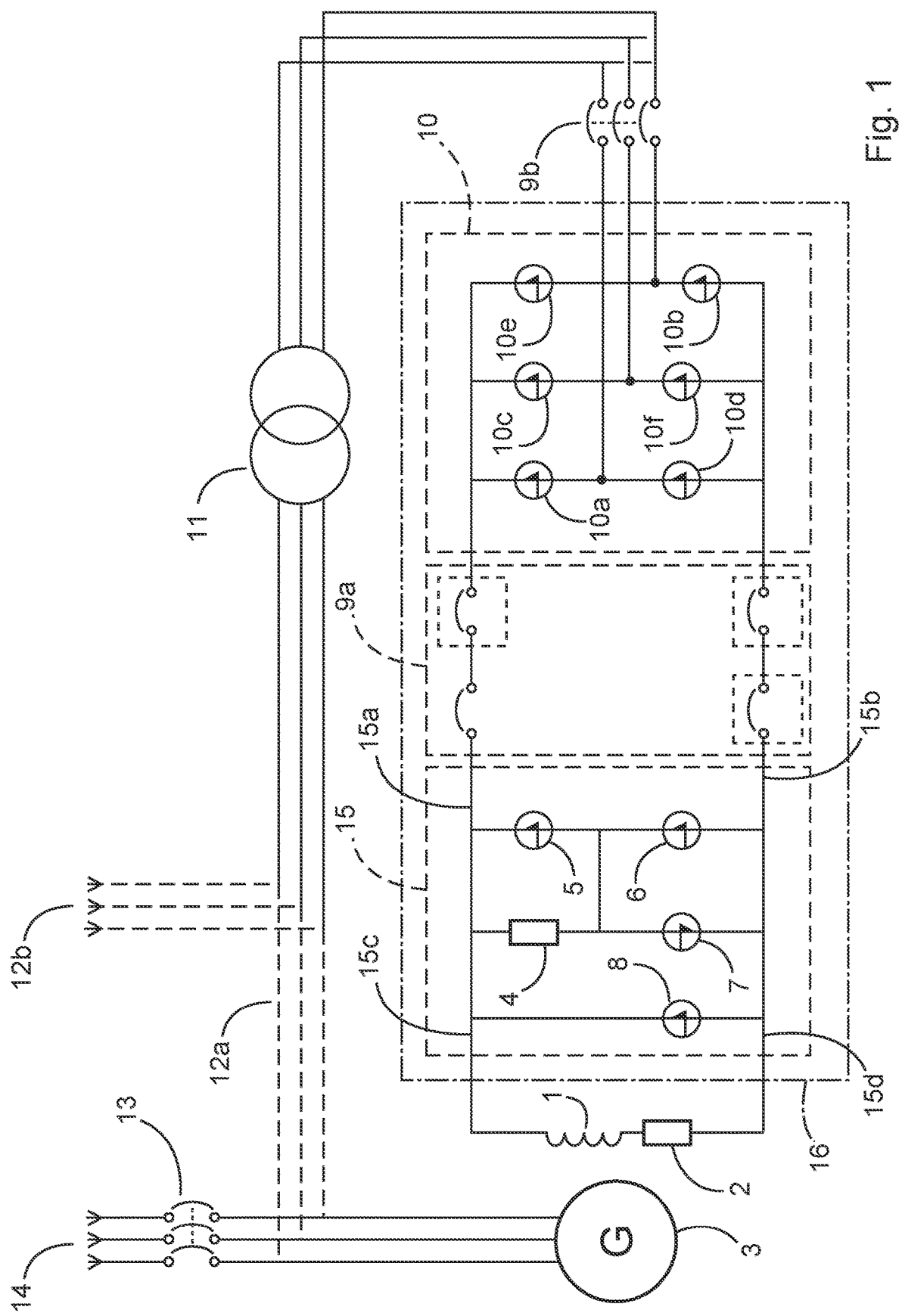
FIG. 1 is a schematic of an exemplary embodiment of an exciting system for a generator with a power supply and a de-exciting system in accordance with the disclosure.
Figure 2A:
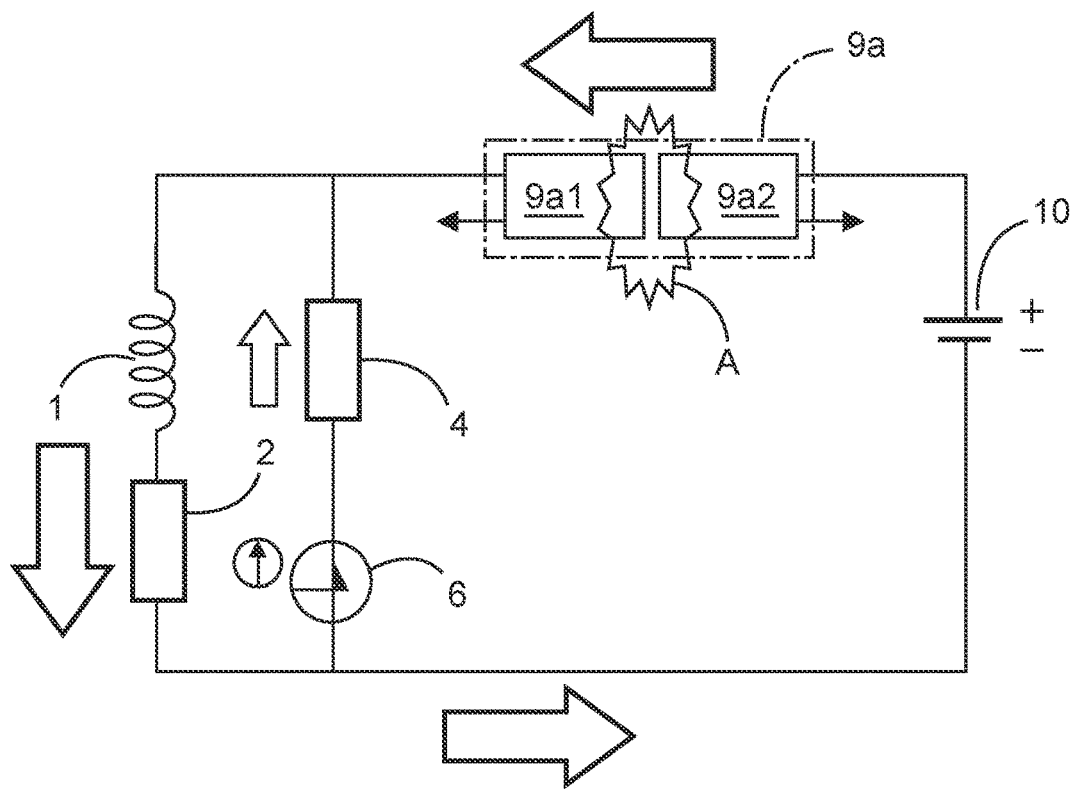
FIG. 2a is an illustration of the arcing issue in a circuit breaker that is relieved by the de-exciting system in accordance with the prior art.
Figure 2B:
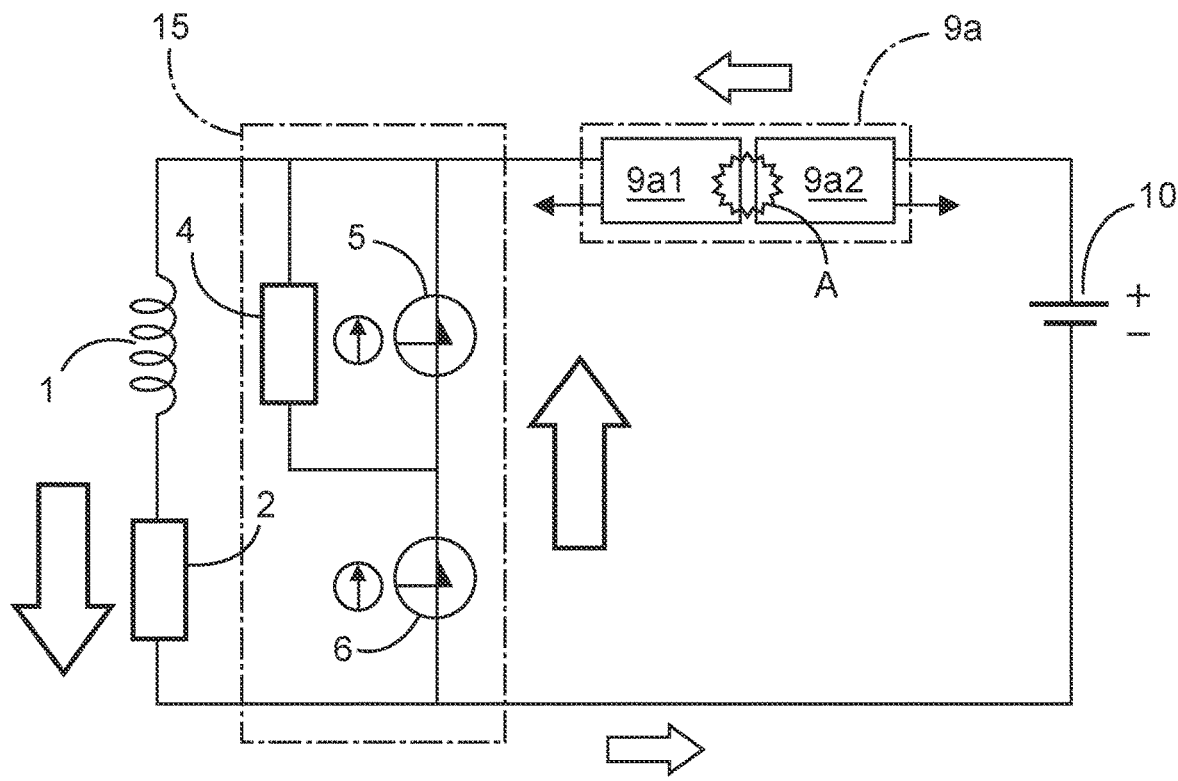
FIG. 2b is an illustration of an arc in a circuit in accordance with the disclosure.
Figure 2C:
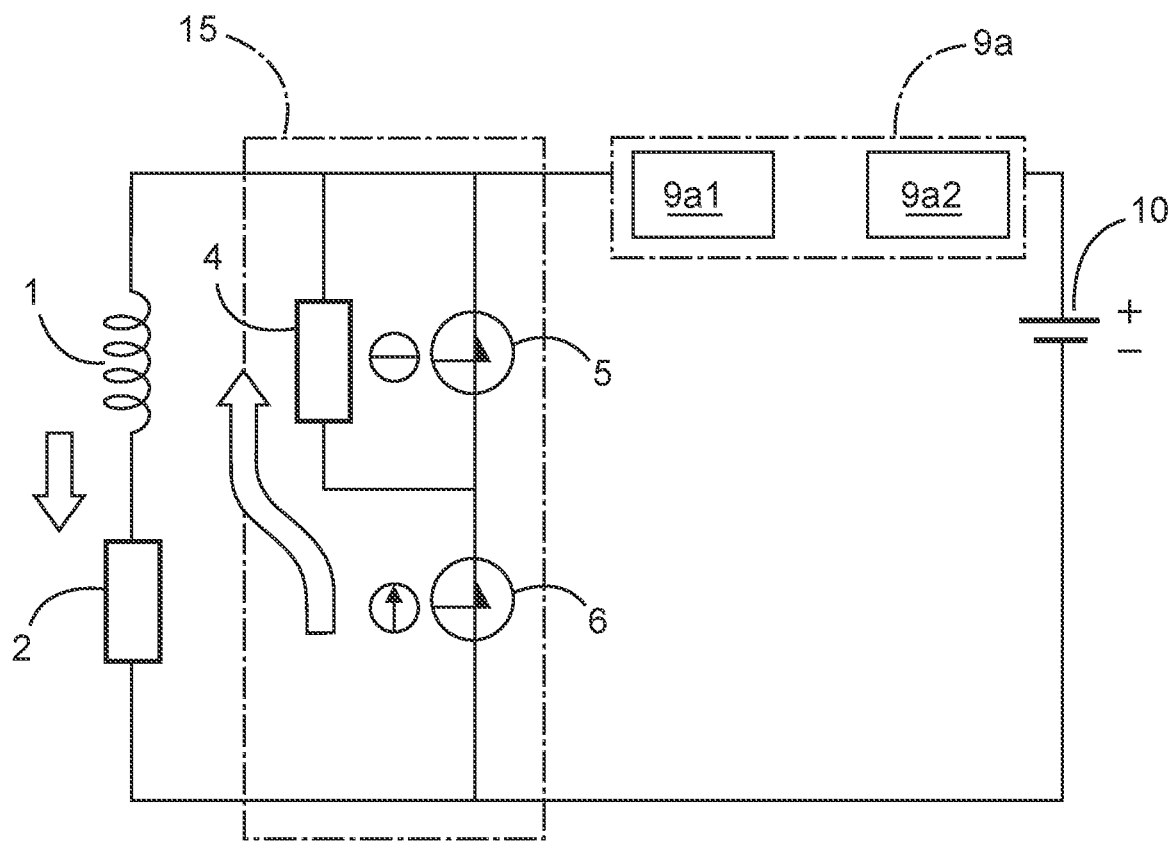
FIG. 2c is a schematic of a circuit in accordance with the disclosure.

FIG. 1 is an exemplary embodiment of an exciting system for a generator 3 with a power supply 10 and a de-exciting system 15; FIGS. 2a-2c are illustrations of the arcing issue in a circuit breaker 9a that is relieved by the de-exciting system 15.

FIG. 1 shows a generator 3 as a synchronous machine that is equipped with an exciting system 16. The exciting system 16 comprises a power supply 10 and a de-exciting system 15. The exciting system 16 powers a field winding 1 of the generator 3. The Ohmic component of the impedance of the field winding 1 is symbolized by an equivalent resistor 2.

The generator 3 supplies generated power to a power grid via a line switch 13 and a line connection 14. Power for the exciting system 16 may be drawn via a shunt connection 12a from the power generated by the generator 3, and/or from an auxiliary line connection 12b. This power is typically high voltage. The high voltage is stepped down for use by the excitation system 16 by a step-down transformer 11. The power for the exciting system may be switched on and off by means of one or more single-pole or multi-pole DC circuit breakers 9a within the exciting system 16, and/or by means of a circuit breaker 9b in the 3-phase power line to the exciting system 16.

The power supply 10 of the exciting system 16 is an inverter that switches the three phases of the 3-phase AC power to a positive bus (+) and a negative bus (−) according to a time program using the six switching elements 10a-10f.

The de-exciting system 15 has two power input terminals 15a and 15b that are connected to the positive and negative bus of the power supply 10, respectively, as well as two power output terminals 15c and 15d that are connected to the field winding 1 including its equivalent resistance 2. The de-exciting system 15 comprises a discharge resistor 4 in series connection with a discharge switching element 6, as well as a bypass switching element 5 that is connected in parallel to the discharge resistor 4. A backup switching element 8 provides an alternative way to discharge field current in case the discharge switching element 6 fails. An induced field switching element 7 is provided in an anti-parallel configuration with the discharge switching element 6. This induced field switching element 7 is activated to dissipate an AC current that is induced by the generator 3 in the field winding 1 and has an amplitude that is larger than the amplitude of the DC current from the power supply 10.

FIGS. 2a-2c illustrate the beneficial effect of the invention on the life of a circuit breaker 9a that controls the delivery of power to the field winding 1. In FIGS. 2a-2c, strengths of currents involved are indicated by thicknesses of arrows. For clarity, the induced field switching element 7 has been omitted from the figures.

FIG. 2a illustrates the de-excitation process according to the prior art, where only the combination of the discharge resistor 4 and the discharge switching element 6 is used and the bypass switching element 5 is missing. Starting from a state where a large current is circulating between the power supply 10 and the field winding 1, the discharge switching element 6 is switched into a conducting state, so that field current starts being dissipated in the discharge resistor 4. At the same time, the contacts 9a1 and 9a2 of the circuit breaker 9a start to move apart. Because of the rather high resistance of the discharge resistor 4, only a rather small current is being discharged through it. This means that at the moment where the contacts 9a1 and 9a2 of the circuit breaker 9a start to separate, a rather large current is flowing across it. This results in a high energy arc A that is damaging to the contacts 9a1 and 9a2.

FIG. 2b illustrates the first de-excitation phase in an embodiment of the de-exciting system 15. In the first de-excitation phase, both the discharge switching element 6 and the bypass switching element 5 are in a conducting state. This has the effect that a rather high current is being discharged across the discharge switching element 6 and the bypass switching element 5. At the same time, the current drawn from the power supply 10 is decreasing. Because the voltage across the circuit breaker 9a increases with decreasing current, the increase of the discharge current and simultaneous decrease of the current drawn from the power supply 10 is self-escalating. Therefore, the arc A is far less energetic. On the other hand, due to the rather low resistance of the path across the discharge switching element 6 and the bypass switching element 5, the increase of the voltage across the circuit breaker 9a is not so high that it significantly promotes the arcing. Therefore, the circuit breaker 9a is not required to support a high-current arc at a high voltage. If the power supply 10 can be turned off at the same time the circuit breaker 9a starts to open, such as by turning off all the switching elements 10a-10f in the inverter shown in FIG. 1, then the current across the circuit breaker 9a at the start of the opening may be reduced to zero. This may eliminate arcing completely.

FIG. 2c illustrates the second de-excitation phase. Compared with FIG. 2b, the contacts 9a1 and 9a2 of the circuit breaker 9a have now separated far enough so that the circuit breaker 9a has reached its full insulation capability. Therefore, it is no problem anymore that the voltage across the circuit breaker 9a increases much more when the bypass switching element 5 is switched in the non-conducting state, forcing the discharge current onto the much higher-resistance path via the discharge resistor 4. The circuit breaker 9a will not begin to arc again. The high resistance of the discharge resistor 4 can therefore be used to dissipate the energy stored in the field winding 1. The goal is to achieve this state as early as possible, i.e., at a discharge current that is as close as possible to the initial load current.

Preferably, the control means of the de-exciting system are configured to transition from the first de-excitation phase to the second de-excitation phase 100 ms after the start of the first de-excitation phase at the latest. Within this short timeframe, an active cooling of the bypass switching element and the discharge switching element is not required despite the high currents that are initially carried.

In a further advantageous embodiment, the de-exciting system further comprises a unidirectional backup switching element that is connected in parallel to the series connection of the discharge resistor and the discharge switching element. This backup switching element may be used to initiate a slow de-excitation without the discharge resistor in case the discharge switching element, and/or the bypass switching element, fails. As discussed before, the de-excitation system is a safety relevant system, so having this kind of redundancy is advantageous. In addition, even though the discharge switching element and the bypass switching element only carry high currents for a very short time, and they have a very small duty cycle of about 1 second per day compared with a switching element of an inverter, this may nonetheless make these switching elements wear parts.

In a further advantageous embodiment, the control means of the de-exciting system is configured to: monitor a source current that is feeding the inductive circuit through the de-exciting system in the first de-excitation phase and the current through the discharge resistor in the second de-excitation phase, and if the source current does not drop to zero during first de-excitation phase and/or the current trough discharge resistor does not reach a pre-set threshold within a pre-set time after start of the second de-excitation phase, switch the backup switching element into a conducting state. The current through the discharge resistor may fail to increase to the full level of source current if the circuit breaker can't interrupt full current and/or the discharge switching element, and/or the bypass switching element, fails to switch into a conducting state when commanded to do so. In this case, the first de-excitation phase is not entered, and no, or only part of, the field current is being discharged at all. In this case, if the backup switching element is switched into a conducting state, this should allow current to flow through the backup switching element anyway.

As discussed above, the discharge switching element, the bypass switching element, and/or the backup switching element, may preferably be solid-state semiconductor switching elements, whereas the discharge and bypass switching elements must be of unipolar type with blocking capability for the maximum source voltage during normal operation. The switching of these switching elements is fast and does not involve arcing. Also, these switching elements comprise freewheeling diodes that may be used to dissipate field current.

In a further advantageous embodiment, the de-exciting system further comprises an induced field switching element in an anti-parallel configuration with the discharge switching element. This induced field switching element may be used to dissipate an AC current that is induced externally in the inductive circuit and has an amplitude that is larger than the amplitude of the DC current with which an external power supply feeds the inductive circuit through the de-exciting system.

The invention also provides an exciting system for a synchronous machine. This exciting system comprises at least one power supply, a de-exciting system as described before that is configured to be connected to a field winding of the synchronous machine as the inductive circuit, and at least one circuit breaker that controls the flow of power from the power supply to the de-exciting system. To "control the flow of power" specifically comprises that the circuit breaker may control the inflow to the power supply from some power source, such as an electricity grid or a transformer connected to an electricity grid. But to "control the power" also comprises that the circuit breaker may control the outflow of the power from the power supply to the de-exciting system. As discussed before, the presence of the de-exciting system described before reduces the wear of the circuit breaker, as well as the requirement that the circuit breaker be able to break a large current at a particularly high voltage.

In a further advantageous embodiment, the power supply comprises an inverter that is configured to convert an AC supply voltage to a DC voltage for the field winding by switching the AC supply voltage onto the de-exciting system according to a time program. The control means of the de-exciting system are coupled or integrated with control means of the inverter. The control means of the de-exciting system are configured to switch off the inverter within the first de-excitation phase. In particular, switching off the inverter may mean to switch all the switching elements that connect the AC supply voltage to the DC voltage bus. In this manner, a flow of current through the power supply is interrupted immediately: The inverter output voltage follows the latest connected source AC voltage, which means that the inverter is stopping conduction during the negative half cycle of the phase-to-phase source voltage. No matter whether the circuit breaker is connected upstream of the power supply or between the power supply and the de-exciting system, the effect is that the circuit breaker is able to open in a state where it carries no load current. This prevents arcing when the contacts separate. In this case, no particular ability of the circuit breaker to break a certain current at a particular voltage is required.

LIST OF REFERENCE SIGNS 1 field winding in inductive circuit
2 equivalent resistance in inductive circuit
3 generator
4 discharge resistor
5 bypass switching element
6 discharge switching element
7 further switching element for negative load current
8 backup switching element
9a AC circuit breaker
9b DC circuit breaker
10 power supply
10a-10f switching elements in power supply 10
11 step-down transformer
12a shunt connection for powering exciting system 16
12b auxiliary line connection for powering exciting system 16
13 line switch
14 line connection
15 de-exciting system
16 exciting system
A arc All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A de-exciting system for dissipating energy from an inductive circuit that comprises at least one coil, adapted to be attached to said inductive circuit and comprising:
   a series connection of a discharge resistor and a unidirectional discharge switching element, said series connection being arranged such that, if the de-exciting system is attached to the inductive circuit and the discharge switching element is in a conducting state, a closed conducting path comprising the coil and the discharge resistor is formed;

a unidirectional bypass switching element that is connected in parallel to the discharge resistor such that, when the de-exciting system is attached to the inductive circuit and both the discharge switching element and the bypass switching element are in a conducting state, a closed conducting path comprising the coil, the discharge switching element, and the bypass switching element is formed; and a control device configured to: in a first de-excitation phase, switch both the discharge switching element and the bypass switching element into a conducting state, and in a second de-excitation phase, switch the bypass switching element into a non-conducting state, while keeping the discharge switching element in the conducting state.

2. The de-exciting system of claim 1, wherein the control means of the de-exciting system are coupled or integrated with control means of a circuit breaker in a powering path to the inductive circuit and configured to: in response to a request for de-excitation of the inductive circuit, begin the first de-excitation phase before the circuit breaker begins to open.

3. The de-exciting system of claim 2, wherein the control means of the de-exciting system are further configured to: begin the second de-excitation phase after the circuit breaker has reached its full insulation capability.

4. The de-exciting system of claim 1, further comprising a unidirectional backup switching element that is connected in parallel to the series connection of the discharge resistor and the discharge switching element.

5. The de-exciting system of claim 4, wherein the control device of the de-exciting system are configured to: monitor a source current that is feeding the inductive circuit through the de-exciting system in the first de-excitation phase, and monitor the current through the discharge resistor in the second de-excitation phase, and the source current does not drop to zero during the first de-excitation phase, and/or the current through the discharge resistor does not reach a pre-set threshold within a pre-set time after start of the second de-excitation phase, switch the backup switching element into a conducting state.

6. The de-exciting system of claim 1, wherein the discharge switching element, the bypass switching element, and/or the backup switching element, is a solid-state semiconductor switching element.

7. The de-exciting system of claim 1, further comprising an induced field switching element in an anti-parallel configuration with the discharge switching element.

8. The de-exciting system of claim 1, wherein the control means of the de-exciting system are configured to transition from the first de-excitation phase to the second de-excitation phase 100 ms after the start of the first de-excitation phase at the latest.

9. An exciting system for a synchronous machine, comprising at least one power supply, a de-exciting system according to claim 1 that is configured to be connected to a field winding of the synchronous machine as the inductive circuit, and at least one circuit breaker that controls the flow of power from the power supply to the de-exciting system.

10. The exciting system of claim 9, wherein the power supply comprises an inverter that is configured to convert an AC supply voltage to a DC voltage for the field winding by switching the AC supply voltage onto the de-exciting system according to a time program, the control means of the de-exciting system are coupled or integrated with control means of the inverter, and the control means of the de-exciting system are configured to switch off the inverter within the first de-excitation phase.

\* \* \* \* \*